(12) United States Patent
Bahena et al.

(10) Patent No.: US 10,472,077 B2
(45) Date of Patent: Nov. 12, 2019

(54) EVACUATION SYSTEM WITH AN EXTENDABLE HEAD END

(71) Applicant: GOODRICH CORPORATION, Charlotte, NC (US)

(72) Inventors: Daniel Bahena, Phoenix, AZ (US); Timothy C. Haynes, Prescott Valley, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 407 days.

(21) Appl. No.: 15/448,404

(22) Filed: Mar. 2, 2017

(65) Prior Publication Data

US 2018/0251224 A1    Sep. 6, 2018

(51) Int. Cl.
*B64D 25/14* (2006.01)
*B64D 25/08* (2006.01)

(52) U.S. Cl.
CPC ............. *B64D 25/14* (2013.01); *B64D 25/08* (2013.01)

(58) Field of Classification Search
CPC ................................ B64D 25/14; B64D 25/18
USPC ........................................................ 244/905
See application file for complete search history.

(56) References Cited

U.S. PATENT DOCUMENTS

| 3,463,266 | A | 8/1969 | Day |
| 3,554,344 | A | 1/1971 | Summer et al. |
| 5,360,186 | A | 11/1994 | Danielson et al. |
| 5,906,340 | A | 5/1999 | Duggal |
| 6,676,082 | B2 | 1/2004 | Alberts |
| 6,814,183 | B2 | 11/2004 | Horvath et al. |
| 6,959,658 | B2 | 11/2005 | Gronlund et al. |
| 8,215,586 | B2 | 7/2012 | O'Donnell et al. |
| 9,399,519 | B2 | 7/2016 | Rivault et al. |
| 2013/0105245 | A1 | 5/2013 | Brown |
| 2016/0258547 | A1* | 9/2016 | Harlow ................. F16K 31/143 |

FOREIGN PATENT DOCUMENTS

| EP | 1410986 | 4/2004 |
| EP | 1410987 | 4/2004 |
| EP | 3118117 | 1/2017 |

OTHER PUBLICATIONS

European Patent Office, European Search Report dated Jul. 23, 2018 in Application No. 18159778.2-1010.

* cited by examiner

*Primary Examiner* — J. Woodrow Eldred (57) ABSTRACT

An inflatable flotation device includes a main body having a distal end and a proximal end configured to be positioned nearer to the aircraft than the distal end, the main body configured to inflate to provide an evacuation route. The inflatable flotation device further includes an extendable portion coupled to the proximal end of the main body and having a plurality of segments coupled together. The inflatable flotation device further includes a weighted object coupled to the extendable portion and configured to cause the extendable portion to extend in response to a distance from the proximal end of the main body being equal to or greater than a threshold distance.

18 Claims, 7 Drawing Sheets

EVACUATION SYSTEM WITH AN EXTENDABLE HEAD END

FIELD

The present disclosure is directed to evacuation systems for use in aircraft and, more particularly, extendable inflatable flotation devices for use with evacuation systems.

BACKGROUND

Evacuation systems of aircraft may include an inflatable flotation device, such as an evacuation slide, and an aspirator for inflating the inflatable flotation device. Inflatable flotation devices may be designed to be detached from the corresponding aircraft or permanently attached to the aircraft. In that regard, the inflatable flotation devices may provide a ramp from a sill of the aircraft to a ground surface which may include water or land. A slope of the inflatable flotation device may vary based on an angle of the aircraft upon landing or based on characteristics of the ground surface.

SUMMARY

Described herein is an inflatable flotation device designed to be used with an aircraft. The inflatable flotation device includes a main body having a distal end and a proximal end configured to be positioned nearer to the aircraft than the distal end, the main body configured to inflate to provide an evacuation route. The inflatable flotation device further includes an extendable portion coupled to the proximal end of the main body and having a plurality of segments coupled together. The inflatable flotation device further includes a weighted object coupled to the extendable portion and configured to cause the extendable portion to extend in response to a distance from the proximal end of the main body being equal to or greater than a threshold distance.

Any of the foregoing embodiments may also include at least one thread configured to be used to lace at least some of the plurality of segments together, wherein the weighted object is coupled to the at least one thread and configured to loosen the at least one thread to allow the extendable portion to extend in response to the distance from the proximal end of the main body being equal to or greater than the threshold distance.

In any of the foregoing embodiments, the extendable portion further includes an extendable tube in fluid communication with the main body and configured to receive pressurized air from the main body and inflate in response to the at least one thread being loosened.

In any of the foregoing embodiments, the plurality of segments includes a first segment having a first distal end and a first proximate end and a second segment having a second distal end and a second proximate end positioned adjacent the first proximate end in response to the extendable portion being extended, the first distal end and the second distal end each define a plurality of openings, and the at least one thread is configured to be laced through the plurality of openings of the first distal end and the plurality of openings of the second distal end.

In any of the foregoing embodiments, the at least one thread is configured to extend through each of the plurality of openings and form corresponding loops in a first direction, each loop is configured to be threaded through an adjacent loop, and a last loop is configured to be coupled to the weighted object such that the weighted object releases the last loop in response to the distance from the proximal end of the main body being equal to or greater than the threshold distance.

Any of the foregoing embodiments may also include a pin coupled to the weighted object and wherein the pin is configured to extend through the last loop such that gravity causes the weighted object to pull the pin from the last loop, loosening the at least one thread and allowing the extendable portion to extend in response to the distance from the proximal end of the main body being equal to or greater than the threshold distance.

Any of the foregoing embodiments may also include a manual pull handle coupled to the at least one thread and configured to loosen the at least one thread to allow the extendable portion to extend in response to manual actuation.

Any of the foregoing embodiments may also include a second extendable portion and a second weighted object coupled to the second extendable portion and configured to cause the second extendable portion to extend in response to the distance from the proximal end of the main body being equal to or greater than a second threshold distance.

In any of the foregoing embodiments, the weighted object includes a canopy pouch.

Also described is in inflatable flotation device designed to be used with an aircraft. The inflatable flotation device includes a main body having a distal end and a proximal end configured to be positioned nearer to the aircraft than the distal end, the main body configured to inflate to provide an evacuation route. The inflatable flotation device also includes an extendable portion coupled to the proximal end of the main body and having a plurality of segments coupled together. The inflatable flotation device also includes at least one thread configured to be used to lace at least some of the plurality of segments together. The inflatable flotation device also includes a weighted object coupled to the at least one thread and configured to loosen the at least one thread to allow the extendable portion to extend in response to a distance from the proximal end of the main body being equal to or greater than a threshold distance.

In any of the foregoing embodiments, the extendable portion further includes an extendable tube in fluid communication with the main body and configured to receive pressurized air from the main body and inflate in response to the at least one thread being loosened.

In any of the foregoing embodiments, the plurality of segments includes a first segment having a first distal end and a first proximate end and a second segment having a second distal end and a second proximate end positioned adjacent the first proximate end in response to the extendable portion being extended, the first distal end and the second distal end each define a plurality of openings, and the at least one thread is configured to be laced through the plurality of openings of the first distal end and the plurality of openings of the second distal end.

In any of the foregoing embodiments, the at least one thread is configured to extend through each of the plurality of openings and form corresponding loops in a first direction, each loop is configured to be threaded through an adjacent loop, and a last loop is configured to be coupled to the weighted object such that the weighted object releases the last loop in response to the distance from the proximal end of the main body being equal to or greater than the threshold distance.

Any of the foregoing embodiments may also include a pin coupled to the weighted object and wherein the pin is configured to extend through the last loop such that gravity causes the weighted object to pull the pin from the last loop, loosening the at least one thread and allowing the extendable portion to extend in response to the distance from the proximal end of the main body being equal to or greater than the threshold distance.

Any of the foregoing embodiments may also include a manual pull handle coupled to the at least one thread and configured to loosen the at least one thread to allow the extendable portion to extend in response to manual actuation.

Any of the foregoing embodiments may also include a second extendable portion having a plurality of second segments coupled together, at least a second thread configured to be used to lace at least some of the plurality of second segments together, and a second weighted object coupled to the at least the second thread and configured to cause the second extendable portion to extend in response to the distance from the proximal end of the main body being equal to or greater than a second threshold distance that is greater than the threshold distance.

Also described is an aircraft evacuation system for use in an aircraft. The aircraft evacuation system includes an inflatable flotation device having a main body having a distal end and a proximal end configured to be positioned nearer to the aircraft than the distal end, the main body configured to inflate to provide an evacuation route to a surface upon which the aircraft is resting. The inflatable flotation device further includes an extendable portion coupled to the proximal end of the main body and having a plurality of segments coupled together. The inflatable flotation device also includes a weighted object coupled to the extendable portion and configured to cause the extendable portion to extend in response to a distance between the proximal end of the main body and the surface upon which the aircraft is resting being equal to or greater than a threshold distance. The aircraft evacuation system further includes an aspirator coupled to the main body and configured to output gas to inflate the main body.

In any of the foregoing embodiments, the inflatable flotation device further includes at least one thread configured to be used to lace at least some of the plurality of segments together, wherein the weighted object is coupled to the at least one thread and configured to loosen the at least one thread to allow the extendable portion to extend in response to the distance between the proximal end of the main body and the surface upon which the aircraft is resting being equal to or greater than the threshold distance.

In any of the foregoing embodiments, the extendable portion further includes an extendable tube in fluid communication with the main body and configured to receive pressurized air from the main body and inflate in response to the at least one thread being loosened.

In any of the foregoing embodiments, the plurality of segments includes a first segment having a first distal end and a first proximate end and a second segment having a second distal end and a second proximate end positioned adjacent the first proximate end in response to the extendable portion being extended, the first distal end and the second distal end each define a plurality of openings, and the at least one thread is configured to be laced through the plurality of openings of the first distal end and the plurality of openings of the second distal end.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
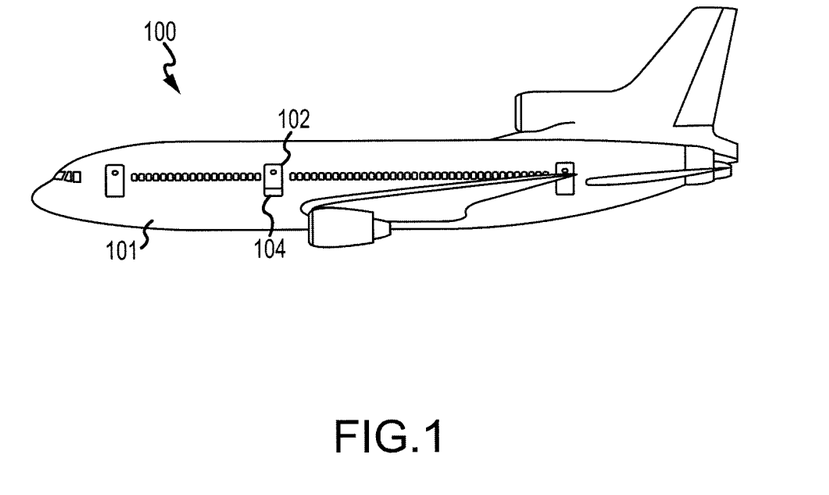
FIG. 1 is a drawing of an aircraft having an exit door and an evacuation system, in accordance with various embodiments.

Referring now to FIG. 1, an aircraft 100 is shown. The aircraft 100 may include a fuselage 101 having plurality of exit doors including an exit door 102. The aircraft 100 may include one or more evacuation systems positioned near a corresponding exit door. For example, the aircraft 100 includes an evacuation system 104 positioned near the exit door 102. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
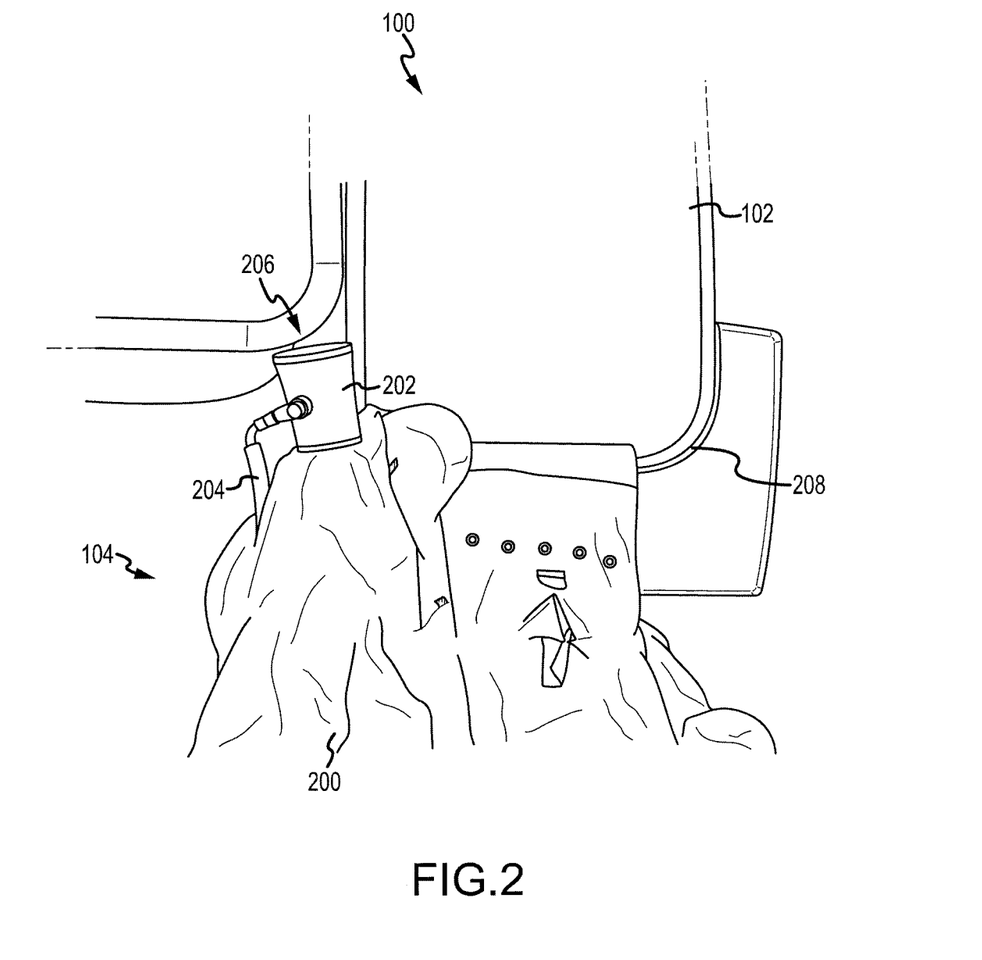
FIG. 2 is a drawing of the evacuation system of FIG. 1 including an inflatable flotation device, in accordance with various embodiments.

Turning to FIG. 2, additional details of the evacuation system 104 are illustrated. In particular, the evacuation system 104 includes an inflatable flotation device 200. The evacuation system 104 further includes a source of forced gas 206. The source of forced gas 206 may cause a gas to enter the inflatable flotation device 200 to inflate the inflatable flotation device 200. The inflatable flotation device 200 may be coupled to the fuselage 101 of FIG. 1, and may be decoupled from the fuselage 101 in response to being fully inflated or to being manually detached in order to allow passengers and/or crew members to safely float away from the aircraft 100 of FIG. 1. In various embodiments, the inflatable flotation device 200 may be permanently coupled to the fuselage 101. In various embodiments, the inflatable flotation device 200 may function as a slide from the fuselage 101 to a ground surface upon which the aircraft 100 is resting.

The source of forced gas 206 may include an aspirator 202 coupled to the inflatable flotation device 200, piping 204 coupled to the aspirator 202, and a compressed fluid source coupled to the piping 204. Under normal operating conditions, the inflatable flotation device 200 may be deflated and stored within a compartment of the aircraft 100. In various embodiments, the inflatable flotation device 200 and the aspirator 202 may be stored in a single package within the aircraft compartment. In response to deployment of the evacuation system 104, fluid may flow into the aspirator 202 via the piping 204 at a relatively high velocity. This fluid flow may cause the aspirator 202 to draw gas from the environment. The fluid flow (such as in a gaseous state) and the environmental gas may be directed into the inflatable flotation device 200. In response to receiving the fluid flow and the environmental gas, the inflatable flotation device 200 may begin to inflate.

Figure 3:
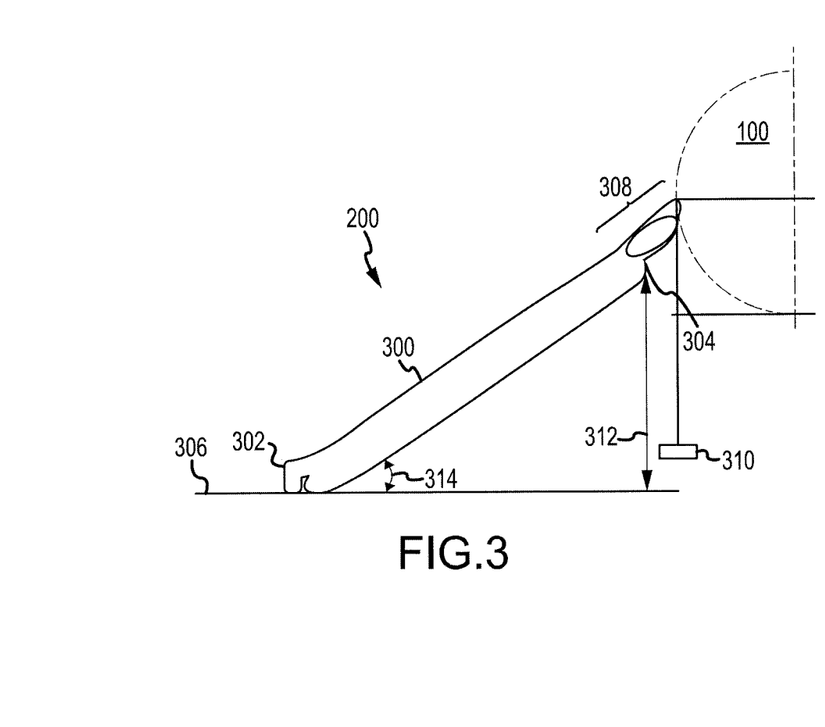
FIG. 3 is a drawing of the inflatable flotation device of FIG. 2 including an extendable portion, in accordance with various embodiments.

Turning now to FIG. 3, the inflatable flotation device 200 may include a main body 300 and an extendable portion 308. The main body 300 may define a volume capable of receiving gas from the aspirator 202 of FIG. 2. The main body 300 may further define a surface on which passengers may rest in response to the inflatable flotation device 200 being detached from the aircraft 100. The main body 300 may include a distal end 302 and a proximal end 304. The proximal end 304 may be positioned nearest the aircraft 100 in response to the inflatable flotation device 200 being deployed.

The inflatable flotation device 200 may further include a weighted object 310, such as a canopy pouch. After the inflatable flotation device 200 has been detached from the aircraft 100, a canopy stored in the canopy pouch may be removed and fastened to the main body 300 to provide shade. In various embodiments, the weighted object 310 may include any other object.

In response to the aircraft 100 landing on a surface 306 during an emergency landing, it is desirable for the inflatable flotation device 200 to inflate in order to provide a ramp for passengers to access the surface 306. Depending on the terrain, a distance from the aircraft 100 to the surface 306 may vary. In that regard, it is undesirable for a slope 314 of the main body 300 to be relatively large, such as greater than 40 degrees, 45 degrees, 60 degrees, 75 degrees, or the like.

In that regard, the extendable portion 308 may extend to increase a total length of the inflatable flotation device 200 in response to a distance 312 between the proximal end 304 of the main body 300 and the surface 306 being equal to or greater than a threshold distance. In various embodiments, the threshold distance may correspond to a distance at which the slope 314 of the main body 300 is greater than a predetermined angle, such as 40 degrees, 45 degrees, 50 degrees, or the like.

The weighted object 310 may be coupled to the extendable portion 308. In response to the distance 312 being greater than the predetermined distance, the weighted object 310 may be positioned above the surface 306. In that regard, gravity may act on the weighted object 310, thus exerting a force on the extendable portion 308. In response to the force being exerted on the extendable portion 308, the extendable portion 308 may convert to an extended state. In that regard, the extendable portion 308 may remain compressed in response to the distance 312 being less than or equal to the predetermined distance and may extend in response to the distance 312 being greater than or equal to the predetermined distance.

Figure 4:
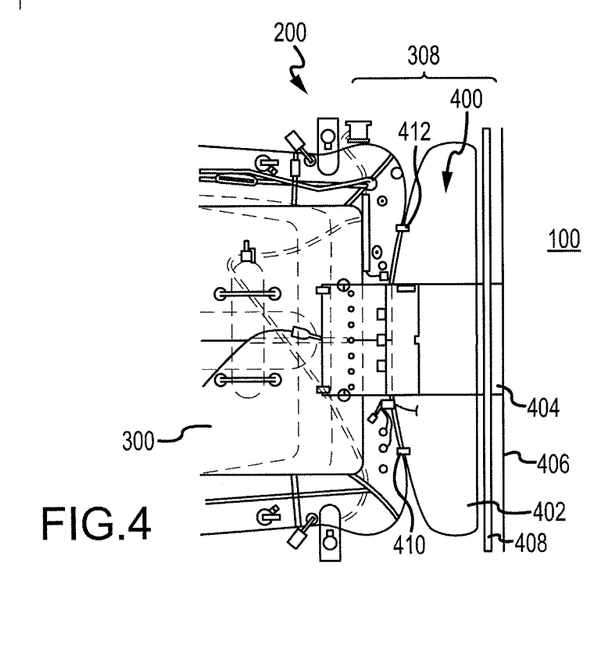
FIG. 4 is a drawing of the extendable portion of the inflatable flotation device of FIG. 3 including a plurality of segments and an extendable tube, in accordance with various embodiments.

Turning now to FIG. 4, additional details of the extendable portion 308 are shown. The extendable portion 308 includes a plurality of segments 400. The plurality of segments 400 may be folded over each other and woven together. The extendable portion 308 further includes an extendable tube 402. The extendable tube 402 may be positioned between two or more of the plurality of segments 400.

In various embodiments, each of the plurality of segments 400 may include a relatively durable material or combination of materials such as a single ply nylon base cloth. In various embodiments, each of the plurality of segments 400 may include a single ply nylon base cloth along with a gray neoprene coating on a top side and a conductive white neoprene coating on a bottom side.

In response to inflation of the main body 300, the plurality of segments 400 may remain folded over each other and woven together. Thus, the extendable tube 402 may remain compressed between the two or more of the plurality of segments 400. In response to the lacing between the plurality of segments 400 becoming loose, the plurality of segments 400 may unfold, thus extending a length of the extendable portion 308. In response to the plurality of segments 400 unfolding, the extendable tube 402 has room to expand.

The extendable tube 402 may be in fluid communication with the main body 300 via a plurality of communication holes including a first communication hole 410 and a second communication hole 412. In response to the plurality of segments 400 unfolding, the extendable tube 402 may receive gas via the communication holes 410, 412 and inflate. Thus, in response to the lacing between the plurality of segments 400 becoming loose, the extendable portion 308 may extend and inflate, increasing a total length of the inflatable flotation device 200.

In various embodiments, the extendable portion 308 may be considered to be a part of a girt. In that regard, the extendable portion 308 may be coupled to a girt sleeve 404. A girt bar 408 may be coupled to a location near a sill 406 of the aircraft 100. The girt sleeve 404 may define an annular volume to be positioned around the girt bar 408. In response to all passengers evacuating the aircraft 100, the extendable portion 308 may be separated from the girt sleeve 404 in order to separate the inflatable flotation device 200 from the aircraft 100.

Figure 5A:
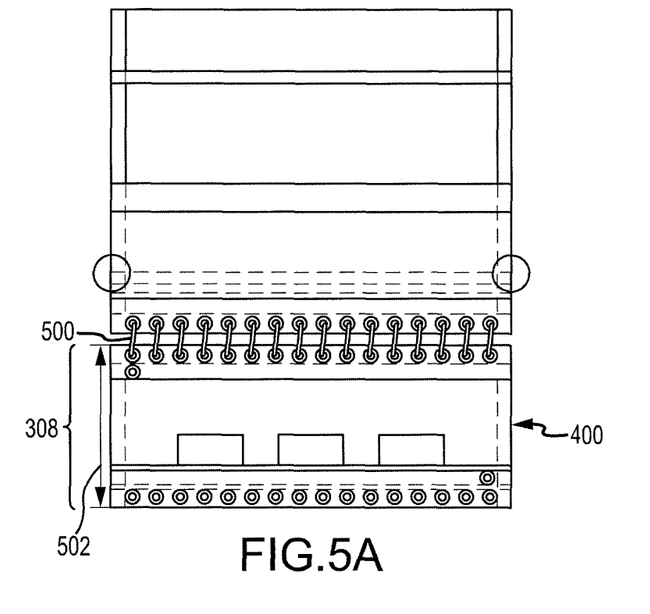
FIG. 5A is a drawing of the plurality of segments of the extendable portion of FIG. 4 in a packed state, in accordance with various embodiments.

Turning now to FIG. 5A, additional details of the extendable portion 308 are shown. The extendable portion 308 includes the plurality of segments 400. As shown in FIG. 5A, the plurality of segments 400 are folded over each other. At least one thread 500 may be utilized to lace at least two of the plurality of segments 400 together. As shown, the plurality of segments 400 has a first length 502 in response to the plurality of segments 400 being laced together. In various embodiments, the $1^{st}$ length 502 may be between 5 inches and 20 inches, between 10 inches and 14 inches, or the like. The at least one thread 500 may include one or more of a thread, a string, a rope, a cable, or any other malleable and linear object.

Figure 5B:
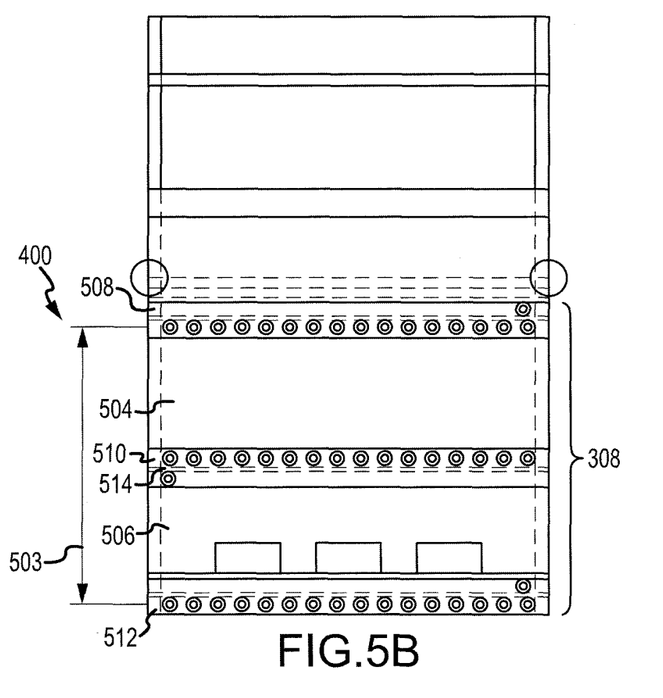
FIG. 5B is a drawing of the plurality of segments of the extendable portion of FIG. 4 in an extended state, in accordance with various embodiments.

Referring now to FIGS. 5A and 5B, the plurality of segments 400 may include a first segment 504 and a second segment 506. The first segment 504 may have a first distal end 508 and a first proximal end 510. The second segment 506 may have a second distal end 512 and a second proximal end 514. In response to the plurality of segments 400 being extended, the first proximal end 510 may be positioned adjacent to the second proximal end 514. Accordingly, the extendable portion 308 may have a second length 503 in response to the extendable portion 308 being extended. In various embodiments, the second length 503 may be approximately twice the first length 502, such as within 25 percent (25%) or ten percent (10%) of the first length 502.

In response to the plurality of segments 400 being folded over each other, the first proximal end 510 may be positioned adjacent to the second proximal end 514, the first distal end 508 may be positioned adjacent to the second distal end 512, and the first distal end 508 may be laced together with the second distal end 512 via the at least one thread 500.

Figure 6:
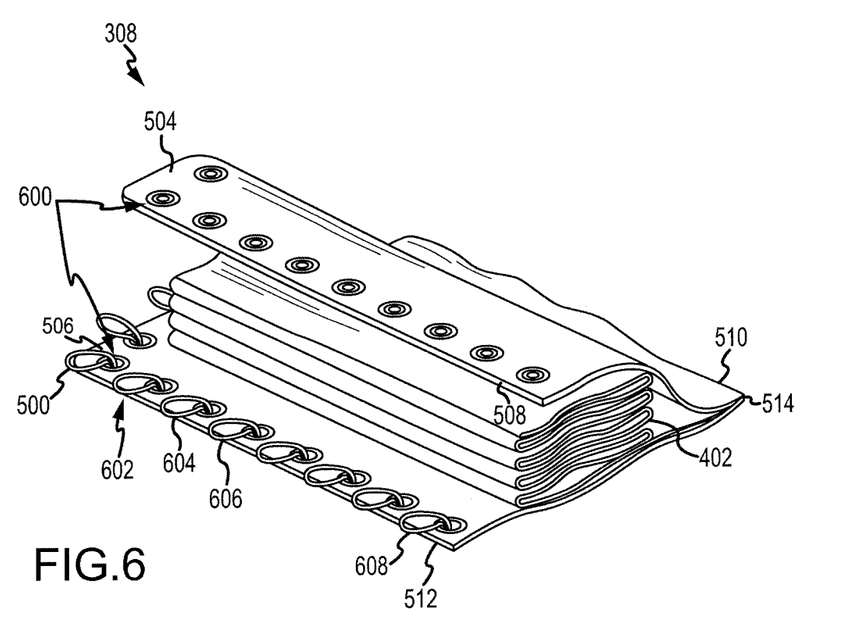
FIG. 6 is a drawing of the plurality of segments of the extendable portion of FIG. 4 in a partially packed state, in accordance with various embodiments.

Turning now to FIG. 6, additional details of the extendable portion 308 are shown. As shown, the first segment 504 and the second segment 506 each define a plurality of openings 600 extending along their corresponding distal end 508, 512. Likewise, FIG. 6 illustrates that the first proximal end 510 may be coupled to the second proximal end 514, such as permanently coupled.

The at least one thread 500 may be extended through each of the plurality of openings 600 of each of the segments 504, 506 to form a plurality of loops 602. Each of the plurality of loops 602 may be oriented in the same direction. The plurality of loops 602 may include a first loop 604, a second loop 606, and a last loop 608. In order to pack the extendable portion 308, the extendable tube 402 may be positioned between the first segment 504 and the second segment 506.

Figure 7:
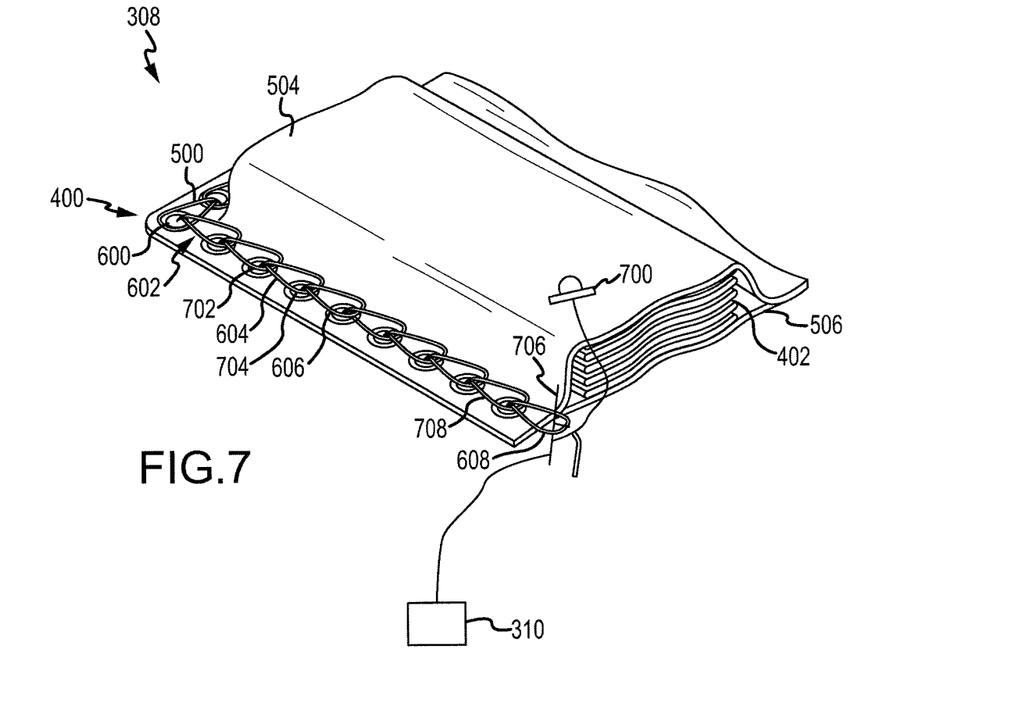
FIG. 7 is a drawing of the plurality of segments of the extendable portion of FIG. 4 in a fully packed state, in accordance with various embodiments.

Turning now to FIG. 7, the extendable portion 308 is shown as fully packed. In that regard, the at least one thread 500 may have complete loops 602 that each extend through one of the plurality of openings 600 of the first segment 504 and a corresponding openings 600 of the second segment 506. Each of the plurality of loops 602 may extend through a pair of the plurality of openings 600 and be threaded through an adjacent loop. For example, the first loop 604 may extend through a first opening 702 and the second loop 606 may extend through a second opening 704. The second loop 606 may be threaded through the first loop 604.

After the plurality of loops 602 have been threaded together in this manner, a pin 706 may be extended through the last loop 608. The pin 706 may be coupled to the weighted object 310. In that regard, in response to the weighted object 310 exerting a sufficient force on the pin 706, the pin 706 may be removed from the last loop 608. In response to the pin 706 being removed from the last loop 608, the last loop 608 may be loosened from a next to last loop 708, which then may be loosened from a following loop until each of the plurality of loops 602 is loosened from each of the other loops 602. In that regard, the first segment 504 and the second segment 506 may be separated from each other, allowing the extendable portion 308 to extend, thus allowing the extendable tube 402 to fill with gas and likewise extend.

The extendable portion 308 may further include a manual pull handle 700 coupled to the pin 706. In that regard, a user floating on an inflatable flotation device may desire to increase a size of the flotation device. Accordingly, the user may exert a force on the manual pull handle 700 to remove the pin 706 from the last loop 608, thus allowing the extendable portion 308 to extend.

Figure 8:
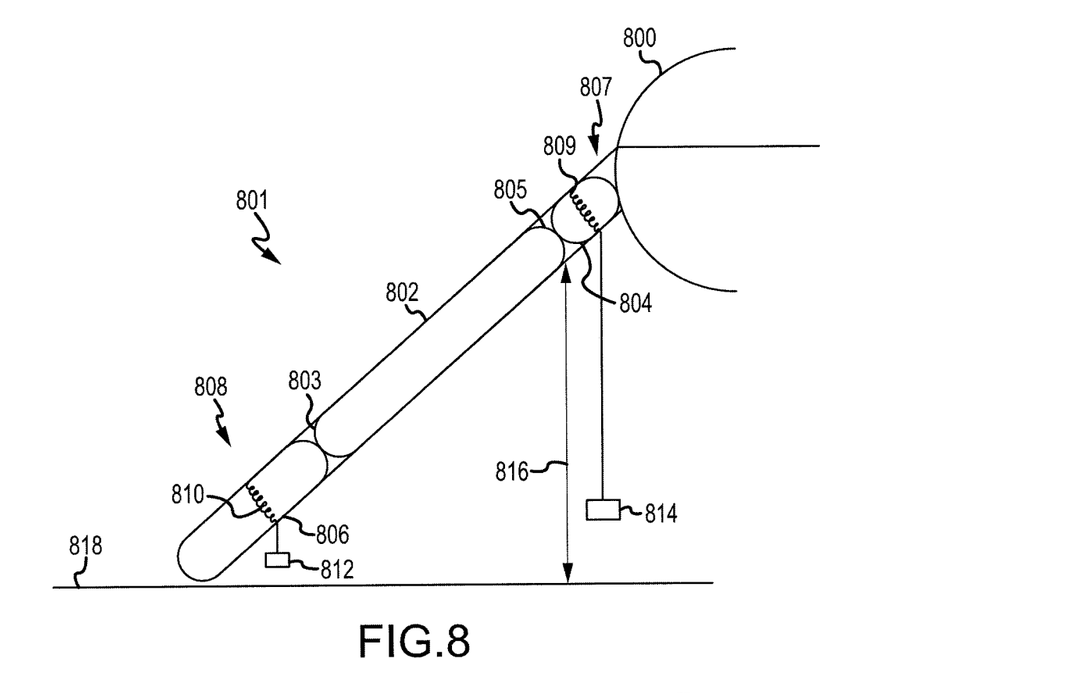
FIG. 8 is a drawing of an inflatable flotation device having multiple extendable portions, in accordance with various embodiments.

Turning now to FIG. 8, an inflatable flotation device 801 may include multiple extendable portions including a first extendable portion 804 and a second extendable portion 806. The inflatable flotation device 801 may further include a main body 802 having a distal end 803 and a proximal end 805. The first extendable portion 804 may be coupled to the proximal end 805, and the second extendable portion 806 may be coupled to the distal end 803.

The first extendable portion 804 may include a plurality of first segments 807 that may be removably coupled together via at least one thread 809. Likewise, the second extendable portion 806 may include a plurality of second segments 808 that may be removably coupled together via at least a second thread 810.

A first weighted object 814 may be coupled to the at least one thread 809 of the first extendable portion 804. Likewise, a second weighted object 812 may be coupled to the at least the second thread 810 of the second extendable portion 806. In various embodiments, one of the first weighted object 814 or the second weighted object 812 may be designed to reach a surface 818 before the other. In that regard, depending upon a distance 816 between the proximal end 805 and the surface 818, one or both of the extendable portions 804, 806 may extend. For example, if the distance 816 is greater than a first threshold distance and less than a second threshold distance then only the first extendable portion 804 may extend. However, if the distance 816 is greater than the first threshold distance and the second threshold distance then the first extendable portion 804 and the second extendable portion 806 may both extend.

Figure 9A:
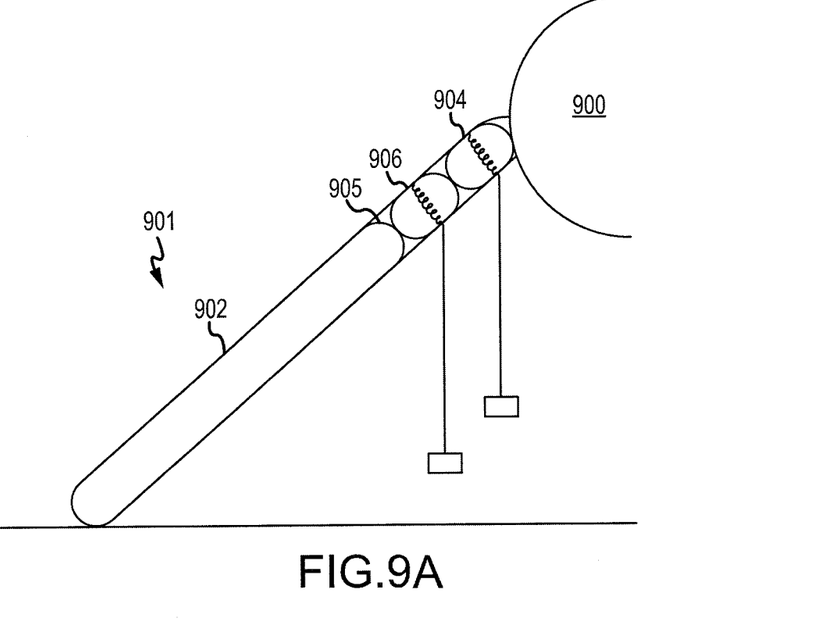
FIG. 9A is a drawing of an inflatable flotation device having multiple extendable portions, in accordance with various embodiments.

Turning now to FIG. 9A, another inflatable flotation device 901 may have a first extendable portion 904, a second extendable portion 906, and a main body 902. The first extendable portion 904 and the second extendable portion 906 may have similar features as the first extendable portion 804 and the second extendable portion 806 of FIG. 8. However, as opposed to the inflatable flotation device 801 of FIG. 8, both extendable portions 904, 906 are positioned on the proximal end 905 of the main body 902. In various embodiments, an inflatable flotation device may have one or more extendable portion on one or both of a proximal end or a distal end.

Figure 9B:
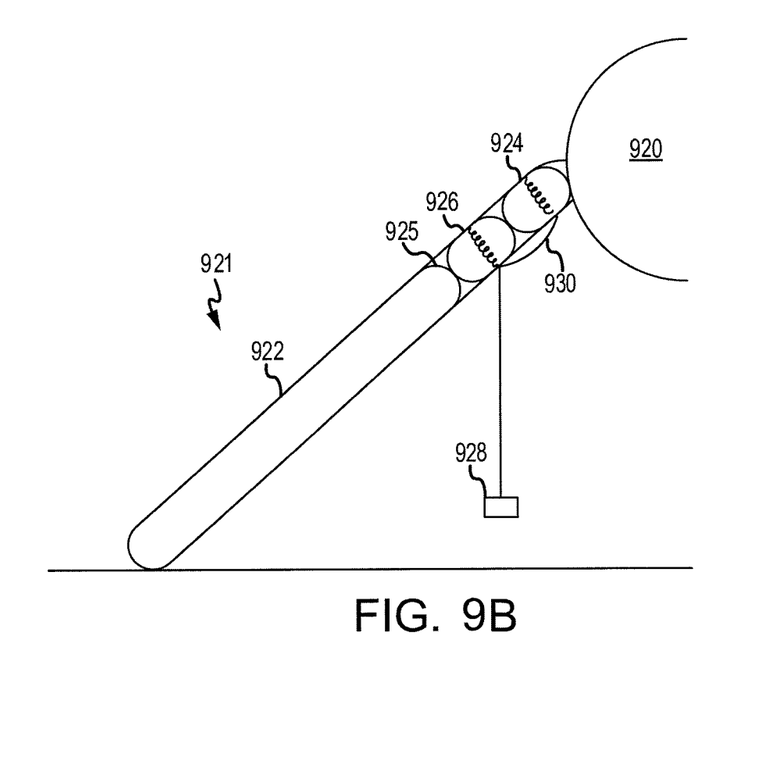
FIG. 9B is a drawing of an inflatable flotation device having multiple extendable portions controlled by a single weighted object, in accordance with various embodiments.

Turning now to FIG. 9B, another inflatable flotation device 921 may have a first extendable portion 924, a second extendable portion 926, and a main body 922. The first extendable portion 924 and the second extendable portion 926 may have similar features as the first extendable portion 904 and the second extendable portion 906 of FIG. 9A. Both extendable portions 924, 926 are positioned on the proximal end 925 of the main body 922. The inflatable flotation device 921 may include a single weighted object 928 capable of controlling both extendable portions 924, 926. As the weighted object 928 begins falling towards the ground, the weighted object 928 may cause the lacing of the extendable portion 924 to unwrap, allowing the extendable portion 924 to extend. If the weighted object 928 has not yet reached a ground surface, a connector 930 may cause the weighted object 928 to unwrap the lacing of the extendable portion 926.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable flotation device designed to be used with an aircraft, comprising:
    a main body having a distal end and a proximal end, the main body configured to inflate to provide an evacuation route to a ground surface upon which the aircraft is resting;
    an extendable portion coupled to the proximal end of the main body and having a plurality of segments coupled together; and
    a weighted object coupled to the extendable portion and configured to cause the extendable portion to extend in response to a distance between the proximal end of the main body and a ground surface being equal to or greater than a threshold distance, the threshold distance being a distance at which the weighted object is suspended above the ground surface,
    wherein the weighted object includes a canopy pouch.

2. The inflatable flotation device of claim 1, further comprising at least one thread configured to be used to lace at least some of the plurality of segments together, wherein the weighted object is coupled to the at least one thread and configured to loosen the at least one thread to allow the extendable portion to extend in response to the distance from the proximal end of the main body to the ground surface being equal to or greater than the threshold distance.

3. The inflatable flotation device of claim 2, wherein the extendable portion further includes an extendable tube in fluid communication with the main body and configured to receive pressurized air from the main body and inflate in response to the at least one thread being loosened.

4. The inflatable flotation device of claim 3, wherein:
    the plurality of segments includes a first segment having a first distal end and a first proximate end and a second segment having a second distal end and a second proximate end positioned adjacent the first proximate end in response to the extendable portion being extended;
    the first distal end and the second distal end each define a plurality of openings; and
    the at least one thread is configured to be laced through the plurality of openings of the first distal end and the plurality of openings of the second distal end.

5. The inflatable flotation device of claim 4, wherein:
    the at least one thread is configured to extend through each of the plurality of openings and form corresponding loops in a first direction;
    each loop is configured to be threaded through an adjacent loop; and
    a last loop is configured to be coupled to the weighted object such that the weighted object releases the last loop in response to the distance between the proximal end of the main body and the ground surface being equal to or greater than the threshold distance.

6. The inflatable flotation device of claim 5, further comprising a pin coupled to the weighted object and wherein the pin is configured to extend through the last loop such that gravity causes the weighted object to pull the pin from the last loop, loosening the at least one thread and allowing the extendable portion to extend in response to the distance between the proximal end of the main body and the ground surface being equal to or greater than the threshold distance.

7. The inflatable flotation device of claim 2, further comprising a manual pull handle coupled to the at least one thread and configured to loosen the at least one thread to allow the extendable portion to extend in response to manual actuation.

8. The inflatable flotation device of claim 1, further comprising:
   a second extendable portion; and
   a second weighted object coupled to the second extendable portion and configured to cause the second extendable portion to extend in response to the distance between the proximal end of the main body and the ground surface being equal to or greater than a second threshold distance.

9. An inflatable flotation device designed to be used with an aircraft, comprising:
   a main body having a distal end and a proximal end, the main body configured to inflate to provide an evacuation route to a ground surface upon which the aircraft is resting;
   a first extendable portion coupled to the proximal end of the main body and having a first plurality of segments coupled together;
   at least a first thread configured to be used to lace at least some of the first plurality of segments together;
   a first weighted object coupled to the at least the first thread and configured to loosen the at least the first thread to allow the first extendable portion to extend in response to a distance between the proximal end of the main body and a ground surface being equal to or greater than a first threshold distance, the first threshold distance being a distance at which the first weighted object is suspended above the ground surface, and the ground surface being a surface upon which the aircraft is resting;
   a second extendable portion having a second plurality of segments coupled together;
   at least a second thread configured to be used to lace at least some of the second plurality of segments together; and
   a second weighted object coupled to the at least the second thread and configured to cause the second extendable portion to extend in response to the distance between the proximal end of the main body and the ground surface being equal to or greater than a second threshold distance that is greater than the threshold distance, the second threshold distance being a distance at which the second weighted object is suspended above the ground surface.

10. The inflatable flotation device of claim 9, wherein the first extendable portion further includes an extendable tube in fluid communication with the main body and configured to receive pressurized air from the main body and inflate in response to the at least the first thread being loosened.

11. The inflatable flotation device of claim 10, wherein:
   The first plurality of segments includes a first segment having a first distal end and a first proximate end and a second segment having a second distal end and a second proximate end positioned adjacent the first proximate end in response to the extendable portion being extended;
   the first distal end and the second distal end each define a plurality of openings; and
   the at least the first thread is configured to be laced through the plurality of openings of the first distal end and the plurality of openings of the second distal end.

12. The inflatable flotation device of claim 11, wherein:
   the at least the first thread is configured to extend through each of the plurality of openings and form corresponding loops in a first direction;
   each loop is configured to be threaded through an adjacent loop; and
   a last loop is configured to be coupled to the weighted object such that the weighted object releases the last loop in response to the distance between the proximal end of the main body and the ground surface being equal to or greater than the first threshold distance.

13. The inflatable flotation device of claim 12, further comprising a pin coupled to the first weighted object and wherein the pin is configured to extend through the last loop such that gravity causes the first weighted object to pull the pin from the last loop, loosening the at least the first thread and allowing the first extendable portion to extend in response to the distance between the proximal end of the main body and the ground surface being equal to or greater than the first threshold distance.

14. The inflatable flotation device of claim 9, further comprising a manual pull handle coupled to the at least the first thread and configured to loosen the at least the first thread to allow the first extendable portion to extend in response to manual actuation.

15. An aircraft evacuation system for use in an aircraft, the aircraft evacuation system comprising:
   an inflatable flotation device having:
      a main body having a distal end and a proximal end, the main body configured to inflate to provide an evacuation route to a ground surface upon which the aircraft is resting,
      an extendable portion coupled to the proximal end of the main body and having a plurality of segments coupled together, and
      a weighted object coupled to the extendable portion and configured to cause the extendable portion to extend in response to a distance between the proximal end of the main body and the ground surface being equal to or greater than a threshold distance, the threshold distance being a distance at which the weighted object is suspended above the ground surface; and
   an aspirator coupled to the main body and configured to output gas to inflate the main body,
   wherein the weighted object includes a canopy pouch.

16. The aircraft evacuation system of claim 15, wherein the inflatable flotation device further includes at least one thread configured to be used to lace at least some of the plurality of segments together, wherein the weighted object is coupled to the at least one thread and configured to loosen the at least one thread to allow the extendable portion to extend in response to the distance between the proximal end of the main body and the ground surface upon which the aircraft is resting being equal to or greater than the threshold distance.

17. The aircraft evacuation system of claim 16, wherein the extendable portion further includes an extendable tube in fluid communication with the main body and configured to receive pressurized air from the main body and inflate in response to the at least one thread being loosened.

18. The aircraft evacuation system of claim 17, wherein:
   the plurality of segments includes a first segment having a first distal end and a first proximate end and a second segment having a second distal end and a second proximate end positioned adjacent the first proximate end in response to the extendable portion being extended;

the first distal end and the second distal end each define a plurality of openings; and the at least one thread is configured to be laced through the plurality of openings of the first distal end and the plurality of openings of the second distal end.

\* \* \* \* \*

UNITED STATES PATENT AND TRADEMARK OFFICE
CERTIFICATE OF CORRECTION

PATENT NO. : 10,472,077 B2  
APPLICATION NO. : 15/448404  
DATED : November 12, 2019  
INVENTOR(S) : Daniel Bahena et al.

Page 1 of 1

It is certified that error appears in the above-identified patent and that said Letters Patent is hereby corrected as shown below:

In the Claims

In Column 12, Lines 56-57, please delete:
"of the main body and the ground surface upon which the aircraft is resting being equal to or greater that the threshold"

And insert:
--of the main body and the ground surface being equal to or greater that the threshold--

Signed and Sealed this
Twenty-fourth Day of November, 2020

Andrei Iancu
*Director of the United States Patent and Trademark Office*